(12) United States Patent
Ding et al.

(10) Patent No.: US 11,681,829 B2
(45) Date of Patent: Jun. 20, 2023

(54) APPROACHES FOR MANAGING RESTRICTIONS FOR MIDDLEWARE APPLICATIONS

(71) Applicant: Palantir Technologies Inc., Denver, CO (US)

(72) Inventors: James Ding, New York, NY (US); Gonçalo Silva Santos, London (GB); Richard Helzberg, San Geronimo, CA (US); Thomas Playford, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/493,168

(22) Filed: Oct. 4, 2021

(65) Prior Publication Data
US 2022/0027489 A1 Jan. 27, 2022

Related U.S. Application Data

(63) Continuation of application No. 16/586,553, filed on Sep. 27, 2019, now Pat. No. 11,138,342, which is a
(Continued)

(51) Int. Cl.
*G06F 21/62* (2013.01)
*G06F 21/60* (2013.01)
(Continued)

(52) U.S. Cl.
CPC .......... *G06F 21/629* (2013.01); *G06F 21/604* (2013.01); *H04L 63/101* (2013.01);
(Continued)

(58) Field of Classification Search
CPC ................ G06F 21/629; G06F 21/604; G06F 2221/2135; G06F 2221/2137;
(Continued)

(56) References Cited

U.S. PATENT DOCUMENTS

| 4,899,161 A | 2/1990 | Morin, Jr. et al. |
| 4,958,305 A | 9/1990 | Piazza |

(Continued)

FOREIGN PATENT DOCUMENTS

| DE | 102013222023 A1 | 1/2015 |
| EP | 0763201 A1 | 3/1997 |

(Continued)

OTHER PUBLICATIONS

"A First Look: Predicting Market Demand for Food Retail using a Huff Analysis," TRF Policy Solutions, Jul. 2012, p. 30.
(Continued)

*Primary Examiner* — Darren B Schwartz
(74) *Attorney, Agent, or Firm* — Sheppard Mullin Richter & Hampton LLP (57) ABSTRACT

Systems and methods are provided for determining an access request provided by an application that seeks to interact with one or more backend systems through a computing system. One or more predefined restrictions can be enforced on the application, the computing system, or the one or more backend systems.

14 Claims, 5 Drawing Sheets

Related U.S. Application Data continuation of application No. 16/221,309, filed on Dec. 14, 2018, now Pat. No. 10,467,435.

(60) Provisional application No. 62/750,035, filed on Oct. 24, 2018.

(51) Int. Cl.

| | |
|---|---|
| *H04L 9/40* | (2022.01) |
| *G06F 8/36* | (2018.01) |
| *G06F 8/60* | (2018.01) |
| *G06F 8/71* | (2018.01) |
| *G06F 9/50* | (2006.01) |
| *G06F 21/12* | (2013.01) |
| *G06F 21/53* | (2013.01) |

(52) U.S. Cl.
CPC .... *H04L 63/105* (2013.01); *G06F 2221/2135* (2013.01); *G06F 2221/2137* (2013.01); *G06F 2221/2141* (2013.01); *G06F 2221/2149* (2013.01)

(58) Field of Classification Search
CPC ..... G06F 2221/2141; G06F 2221/2149; G06F 8/36; G06F 8/60; G06F 8/71; G06F 9/5005; G06F 21/121; G06F 21/53; H04L 63/101; H04L 63/105
See application file for complete search history.

(56) References Cited

U.S. PATENT DOCUMENTS

| | | | |
|---|---|---|---|
| 5,329,108 A | 7/1994 | Lamoure | |
| 5,754,182 A | 5/1998 | Kobayashi | |
| 5,781,195 A | 7/1998 | Marvin | |
| 5,781,704 A | 7/1998 | Rossmo | |
| 6,091,956 A | 7/2000 | Hollenberg | |
| 6,157,747 A | 12/2000 | Szeliski et al. | |
| 6,169,552 B1 | 1/2001 | Endo et al. | |
| 6,173,067 B1 | 1/2001 | Payton et al. | |
| 6,178,432 B1 | 1/2001 | Cook et al. | |
| 6,247,019 B1 | 6/2001 | Davies | |
| 6,389,289 B1 | 5/2002 | Voce et al. | |
| 6,414,683 B1 | 7/2002 | Gueziec | |
| 6,483,509 B1 | 11/2002 | Rabenhorst | |
| 6,516,268 B2 | 2/2003 | Ruiz et al. | |
| 6,529,900 B1 | 3/2003 | Patterson et al. | |
| 6,591,417 B1 | 7/2003 | Strysniewicz | |
| 6,631,496 B1 | 10/2003 | Li et al. | |
| 6,662,103 B1 | 12/2003 | Skolnick et al. | |
| 6,671,809 B1 | 12/2003 | Perona | |
| 6,757,445 B1 | 6/2004 | Knopp | |
| 6,828,920 B2 | 12/2004 | Owen et al. | |
| 6,958,753 B2 | 10/2005 | Abe | |
| 6,983,203 B1 | 1/2006 | Wako | |
| 6,985,950 B1 | 1/2006 | Hanson et al. | |
| 7,036,085 B2 | 4/2006 | Barros | |
| 7,051,291 B2 | 5/2006 | Sciammarella et al. | |
| 7,076,741 B2 | 7/2006 | Miyaki | |
| 7,158,878 B2 | 1/2007 | Rasmussen et al. | |
| 7,375,732 B2 | 5/2008 | Aguera Y Arcas | |
| 7,379,811 B2 | 5/2008 | Rasmussen et al. | |
| 7,457,706 B2 | 11/2008 | Melero et al. | |
| 7,502,786 B2 | 3/2009 | Liu et al. | |
| 7,519,470 B2 | 4/2009 | Brasche et al. | |
| 7,529,195 B2 | 5/2009 | Gorman | |
| 7,539,666 B2 | 5/2009 | Ashworth et al. | |
| 7,558,677 B2 | 7/2009 | Jones | |
| 7,574,428 B2 | 8/2009 | Leiserowitz et al. | |
| 7,579,965 B2 | 8/2009 | Bucholz | |
| 7,617,314 B1 | 11/2009 | Bansod et al. | |
| 7,620,628 B2 | 11/2009 | Kapur et al. | |
| 7,663,621 B1 | 2/2010 | Allen et al. | |
| 7,791,616 B2 | 9/2010 | Ioup et al. | |
| 7,805,457 B1 | 9/2010 | Viola et al. | |
| 7,809,703 B2 | 10/2010 | Balabhadrapatruni et al. | |
| 7,872,647 B2 | 1/2011 | Mayer et al. | |
| 7,890,616 B2 | 2/2011 | Wahl | |
| 7,894,984 B2 | 2/2011 | Rasmussen et al. | |
| 7,899,611 B2 | 3/2011 | Downs et al. | |
| 7,920,963 B2 | 4/2011 | Jouline et al. | |
| 7,945,852 B1 | 5/2011 | Pilskalns | |
| 7,962,281 B2 | 6/2011 | Rasmussen et al. | |
| 7,970,240 B1 | 6/2011 | Chao et al. | |
| 8,010,545 B2 | 8/2011 | Stefik et al. | |
| 8,010,783 B1 | 8/2011 | Cahill | |
| 8,036,632 B1 | 10/2011 | Cona et al. | |
| 8,065,080 B2 | 11/2011 | Koch | |
| 8,085,268 B2 | 12/2011 | Carrino et al. | |
| 8,134,457 B2 | 3/2012 | Velipasalar et al. | |
| 8,145,703 B2 | 3/2012 | Frishert et al. | |
| 8,200,676 B2 | 6/2012 | Frank | |
| 8,214,361 B1 | 7/2012 | Sandler et al. | |
| 8,214,764 B2 | 7/2012 | Gemmell et al. | |
| 8,229,947 B2 | 7/2012 | Fujinaga | |
| 8,230,333 B2 | 7/2012 | Decherd et al. | |
| 8,290,942 B2 | 10/2012 | Jones et al. | |
| 8,290,943 B2 | 10/2012 | Carbone et al. | |
| 8,301,464 B1 | 10/2012 | Cave et al. | |
| 8,325,178 B1 | 12/2012 | Doyle, Jr. | |
| 8,368,695 B2 | 2/2013 | Howell et al. | |
| 8,397,171 B2 | 3/2013 | Klassen et al. | |
| 8,400,448 B1 | 3/2013 | Doyle, Jr. | |
| 8,407,180 B1 | 3/2013 | Ramesh et al. | |
| 8,412,234 B1 | 4/2013 | Gatmir-Motahari et al. | |
| 8,412,707 B1 | 4/2013 | Mianji | |
| 8,422,825 B1 | 4/2013 | Neophytou et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,508,533 B2 | 8/2013 | Cervelli et al. | |
| 8,514,229 B2 | 8/2013 | Cervelli et al. | |
| 8,515,207 B2 | 8/2013 | Chau | |
| 8,564,596 B2 | 10/2013 | Carrino et al. | |
| 8,681,630 B1 | 3/2014 | Gibson | |
| 8,742,934 B1 | 6/2014 | Sarpy, Sr. et al. | |
| 8,781,169 B2 | 7/2014 | Jackson et al. | |
| 8,799,799 B1 | 8/2014 | Cervelli et al. | |
| 8,830,322 B2 | 9/2014 | Nerayoff et al. | |
| 8,938,686 B1 | 1/2015 | Erenrich et al. | |
| 8,949,164 B1 | 2/2015 | Mohler | |
| 8,983,494 B1 | 3/2015 | Onnen et al. | |
| 9,009,177 B2 | 4/2015 | Zheng et al. | |
| 9,021,384 B1 | 4/2015 | Beard et al. | |
| 9,104,293 B1 | 8/2015 | Kornfeld et al. | |
| 9,104,695 B1 | 8/2015 | Cervelli et al. | |
| 9,111,380 B2 | 8/2015 | Piemonte et al. | |
| 9,129,219 B1 | 9/2015 | Robertson et al. | |
| 9,146,125 B2 | 9/2015 | Vulcano et al. | |
| 9,280,618 B1 | 3/2016 | Bruce et al. | |
| 9,501,345 B1 | 11/2016 | Lietz | |
| 10,552,141 B1 | 2/2020 | Marriner | |
| 10,587,729 B1 | 3/2020 | Jain | |
| 10,698,756 B1 | 6/2020 | Abdelsalam | |
| 2002/0130867 A1 | 9/2002 | Yang et al. | |
| 2003/0052896 A1 | 3/2003 | Higgins et al. | |
| 2003/0103049 A1 | 6/2003 | Kindratenko et al. | |
| 2003/0144868 A1 | 7/2003 | MacIntyre et al. | |
| 2003/0163352 A1 | 8/2003 | Surpin et al. | |
| 2003/0225755 A1 | 12/2003 | Iwayama et al. | |
| 2004/0030492 A1 | 2/2004 | Fox et al. | |
| 2004/0039498 A1 | 2/2004 | Ollis et al. | |
| 2004/0098236 A1 | 5/2004 | Mayer et al. | |
| 2004/0117783 A1 | 6/2004 | Kaminsky | |
| 2005/0031197 A1 | 2/2005 | Knopp | |
| 2005/0034062 A1 | 2/2005 | Bufkin et al. | |
| 2005/0080769 A1 | 4/2005 | Gemmell et al. | |
| 2005/0143602 A1 | 6/2005 | Yada et al. | |
| 2005/0162523 A1 | 7/2005 | Darrell et al. | |
| 2005/0182502 A1 | 8/2005 | Iyengar | |
| 2005/0182793 A1 | 8/2005 | Keenan et al. | |

(56) References Cited

U.S. PATENT DOCUMENTS

| | | |
|---|---|---|
| 2005/0223044 A1 | 10/2005 | Ashworth et al. |
| 2005/0267652 A1 | 12/2005 | Allstadt et al. |
| 2006/0015719 A1 | 1/2006 | Herbert |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0101440 A1 | 5/2007 | Bhatia |
| 2007/0115373 A1 | 5/2007 | Gallagher et al. |
| 2007/0188516 A1 | 8/2007 | Ioup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0163187 A1 | 7/2008 | Loff |
| 2008/0192053 A1 | 8/2008 | Howell et al. |
| 2008/0195417 A1 | 8/2008 | Surpin et al. |
| 2008/0201701 A1 * | 8/2008 | Hofhansl .............. G06F 21/563 717/168 |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao et al. |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shimasaki et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2010/0011446 A1 | 1/2010 | Klucher |
| 2010/0050238 A1 | 2/2010 | Fuccello |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0090025 A1 | 4/2012 | Milner |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0180104 A1 | 7/2012 | Gronich |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0097203 A1 | 4/2013 | Bhattacharjee |
| 2013/0100134 A1 | 4/2013 | Cervelli et al. |
| 2013/0101159 A1 | 4/2013 | Chao et al. |
| 2013/0132398 A1 | 5/2013 | Pfeifle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0263212 A1 | 10/2013 | Faltyn |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg et al. |
| 2014/0068732 A1 | 3/2014 | Hinton |
| 2014/0137184 A1 * | 5/2014 | Russello ................ G06F 21/60 726/1 |
| 2014/0165133 A1 | 6/2014 | Foley |
| 2014/0176606 A1 | 6/2014 | Narayan et al. |
| 2014/0189845 A1 | 7/2014 | Cai |
| 2014/0218400 A1 | 8/2014 | O'Toole et al. |
| 2014/0331279 A1 * | 11/2014 | Aissi ...................... G06F 21/57 726/1 |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter et al. |
| 2015/0059006 A1 | 2/2015 | White |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0363603 A1 * | 12/2015 | Hsu ...................... H04L 63/105 707/783 |
| 2015/0379413 A1 | 12/2015 | Robertson et al. |
| 2016/0182451 A1 | 6/2016 | Nandagopal |
| 2016/0315965 A1 * | 10/2016 | Sastry .................. H04L 63/105 |
| 2016/0357982 A1 * | 12/2016 | Hassanzadeh ........ G06F 21/604 |
| 2017/0013017 A1 | 1/2017 | Chen |
| 2017/0031692 A1 | 2/2017 | Oh |
| 2017/0046512 A1 | 2/2017 | Kedma |
| 2017/0244748 A1 | 8/2017 | Krause |
| 2017/0250853 A1 | 8/2017 | Evans |
| 2018/0219972 A1 * | 8/2018 | Vintzel ...................... G06F 8/61 |

(56) References Cited

U.S. PATENT DOCUMENTS

| | | | |
|---|---|---|---|
| 2019/0050560 A1 | 2/2019 | Pereira | |
| 2019/0179630 A1* | 6/2019 | Arquero | G06F 11/3668 |
| 2020/0267082 A1 | 8/2020 | Dong | |

FOREIGN PATENT DOCUMENTS

| | | | |
|---|---|---|---|
| EP | 2575107 | A2 | 4/2013 |
| EP | 2858014 | A2 | 4/2015 |
| EP | 2963595 | A1 | 1/2016 |
| GB | 2516155 | A | 1/2015 |
| NL | 2012778 | A | 11/2014 |
| NZ | 624557 | A | 8/2014 |
| WO | 9532424 | A1 | 11/1995 |
| WO | 0009529 | A2 | 2/2000 |
| WO | 0198925 | A2 | 12/2001 |
| WO | 2004057268 | A2 | 7/2004 |
| WO | 2005013200 | A1 | 2/2005 |
| WO | 2008064207 | A2 | 5/2008 |
| WO | 2009061501 | A1 | 5/2009 |
| WO | 2009123975 | A1 | 10/2009 |
| WO | 2011058507 | A1 | 5/2011 |

OTHER PUBLICATIONS

"Andy Turner's GISRUK 2012 Notes" <https://docs.google.com/document/d/1cTmxg7mVx5gd891qblCYvCEnHA4QAivH4-l4WpyPsqE4/edit?pli=1> printed Sep. 16, 2013 in 15 pages.
"HunchLab: Heat Map and Kernel Density Calculation for Crime Analysis," Azavea Journal, printed from www.azavea.com/blogs/newsletter/v4i4/kernel-density-capabilities-added-to- -hunchlab/ on Sep. 9, 2014, 2 5b4pages.
Barnes et al., "Viewshed Analysis", GIS-ARC/INFO 2001, <www.evsc.virginia.edu/.about.jhp7e/evsc466/student_pres/Rounds.pdf>-;.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, p. 6.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chowhan, "What is Serverless Computing?", Hands-On Serverless Computing: Build, Run and Orchestrate Serverless Applications Using AWS Lambda, Microsoft Azure Functions, and Google Cloud Functions, Packt Publishing, UK, pp. 7-28, Jul. 2018, retrievedfrom t5b4he Internet: https://ebookcentral.proquest.com/lib/ep-ebooks/reader.action?docID=54753- 51&ppg=22.
Definition "Identify", downloaded Jan. 22, 2015, 1 page.
Definition "Overlay", downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-th- e-huff-model/123411.
Extended European Search Report for EP Appln. No. 19203673.9 dated May 27, 2020, 9 pages.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewe5b4r.html.
Gorr et al., "Crime Hot Spot Forecasting: Modeling and Comparative Evaluation", Grant 98-IJ-CX-K005, May 6, 2002, 37 pages.
Griffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, p. 16.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, p. 33.
Huff, David L., "Parameter Estimation in the Huff Model," ESRI, ArcUser, Oct.-Dec. 2003, pp. 34-36.
Ipbucker, C., "Inverse Transformation for Several Pseudo-cylindrical Map Projections Using Jacobian Matrix," ICCSA 2009, Part 1 LNCS 5592, pp. 553-564.
Issue Notification for U.S. Appl. No. 13/917,571 dated Aug. 5, 2014.
Levine, N., "Crime Mapping and the Crimestat Program," Geographical Analysis, 2006, vol. 38, pp. 5b441-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, p. 8.
Mandagere, Nagapramod, "Buffer Operations in GIS," <http://www-users.cs.umn.edu/.about.npramod/enc_pdf.pdf> retrieved Jan. 28, 2010, p. 7.
Map Builder, "Rapid Mashup Development Tool for Google and Yahoo Maps!" <http://web.archive.org/web/20090626224734/http://www.mapbuilder.net/&- gt; printed Jul. 20, 2012 in 2 pages.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Notice of Acceptance for Australian Patent Application No. 2012216622 dated Jan. 6, 2015.
Notice of Allowance for U.S. Appl. No. 13/948,859 dated Dec. 10, 2014.
Notice of Allowance for U.S. Appl. No. 12/840,673 dated Apr. 6, 2015.
Notice of Allowance for U.S. Appl. No. 13/728,879 dated Jun. 21, 2016.
Notice of Allowance for U.S. Appl. No. 14/294,098 dated Dec. 29, 2014.
Notice of Allowance for U.S. Appl. No. 14/319,161 dated May 4, 2015.
Notice of Allowance for U.S. Appl. No. 14/730,123 dated Apr. 12, 2016.
Official Communication for Australian Patent Application No. 2014202442 dated Mar. 19, 2015.
Official Communication for Australian Patent Application No. 2014213553 dated May 7, 2015.
Official Communication for European Patent Application No. 14187739.9 dated Jul. 6, 2015.
Official Communication for Great Britain Patent Application No. 1408025.3 dated Nov. 6, 2014.
Official Communication for Netherlands Patent Application No. 2011632 dated Feb. 8, 2016.
Official Communication for Netherlands Patent Application No. 2012778 dated Sep. 22, 2015.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/840,673 dated Jan. 2, 2015.
Official Communication for U.S. Appl. No. 12/840,673 dated Sep. 17, 2014.
Official Communication for U.S. Appl. No. 13/728,879 dated Aug. 12, 2015.

(56) References Cited

OTHER PUBLICATIONS

Official Communication for U.S. Appl. No. 13/728,879 dated Jan. 27, 2015.
Official Communication for U.S. Appl. No. 13/728,879 dated Mar. 17, 2015.
Official Communication for U.S. Appl. No. 13/728,879 dated Nov. 20, 2015.
Official Communication for U.S. Appl. No. 14/289,596 dated Apr. 30, 2015.
Official Communication for U.S. Appl. No. 14/289,596 dated Jan. 26, 2015.
Official Communication for U.S. Appl. No. 14/289,596 dated Jul. 18, 2014.
Official Communication for U.S. Appl. No. 14/289,596 dated May 9, 2016.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/319,161 dated Jan. 23, 2015.
Official Communication for U.S. Appl. No. 14/490,612 dated Aug. 18, 2015.
Official Communication for U.S. Appl. No. 14/730,123 dated Sep. 21, 2015.
Official Communication for U.S. Appl. No. 14/929,584 dated Feb. 4, 2016.
Official Communication for U.S. Appl. No. 14/929,584 dated May 25, 2016.
Official Communication for U.S. Appl. No. 14/934,004 dated Feb. 16, 2016.
Open Street Map, "Amm's Diary:Unconnected ways and other data quality issues," http://www.openstreetmap.org/user/amm/diary printed Jul. 23, 2012 in 3 pages.
POI Editor, "How to: Create Your Own Points of Interest," <http://www.poieditor.com/articles/how_tocreate_your_own_points_of_interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, p. 8.
Qiu, Fang, "3d Analysis and Surface Modeling", <http://web.archive.org/web/20091202221925/http://www.utsa.edu/Irsg/Te- aching/EES6513/08-3D.pdf> printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pd5b4f>.
Reibel et al., "Areal Interpolation of Population Counts Using Pre-classi_ed Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state- .la.us/gis/instruct_files/tutslide12> printed Jan. 3, 2013 in 1 page.
Tangelder et al., "Freeform Shape Matching Using Minkowski Operations," The Netherlands, Jun. 1996, p. 12.
Thompson, Mick, "Getting Started with GEO," Getting Started with GEO, Jul. 26, 2011.
Valentini et al., "Ensembles of Learning Machines", M. Marinara and R. Tagliaferri (Eds.): Wirn Vietri 2002, LNCS 2486, pp. 3-20.
VB Forums, "Buffer a Poly5b4gon," Internet Citation, <http://www.vbforums.com/showthread.php7198436-Buffer-a-Polygon>, Specifically Thread #1, #5 & #11 retrieved on May 2, 2013, p. 8.
Vivid Solutions, "JTS Topology Suite: Technical Specifications," <http://www.vividsolutions.com/jts/bin/JTS%20Technical%20Specs.pdf> Version 1.4, 2003, p. 36.
Wikipedia, "Douglas_Peucker-Algorithms," <http://de.wikipedia.org/w/index.php?title=Douglas-Peucker-Algorithmus-&oldid=91846042> printed Jul. 2011, p. 2.
Wikipedia, "Ramer_Douglas_Peucker Algorithm," <http://en.wikipedia.org/wiki/Ramer%E2%80%93Douglas%E2%80%93Peucker_al- gorithm> printed Jul. 2011, p. 3.
Wongsuphasawat et al., "Visual Analytics for Transportation Incident Data Sets," Transportation Research Record 2138, 2009, pp. 135-145.
Woodbridge, Stephen, "[geos-devel] Polygon simplification," <http://lists.osgeo.org/pipermail/geos-devel/2011-May/005210.html> dated May 8, 2011, p. 3.

\* cited by examiner

```
Determine an access request provided by an application that seeks to
interact with one or more backend systems through a computing system
302
```

↓

```
Enforce one or more predefined restrictions on the application, the
computing system, or the one or more backend systems
304
```

APPROACHES FOR MANAGING RESTRICTIONS FOR MIDDLEWARE APPLICATIONS

CROSS REFERENCE TO RELATED APPLICATIONS

This application is a continuation of U.S. application Ser. No. 16/586,553, filed Sep. 27, 2019, which is a continuation of U.S. application Ser. No. 16/221,309, filed Dec. 14, 2018, now U.S. Pat. No. 10,467,435, which claims the benefit under 35 U.S.C. § 119(e) of U.S. Provisional Application Ser. No. 62/750,035, filed Oct. 24, 2018, the content of each of which are incorporated by reference in their entirety into the present disclosure.

FIELD OF THE INVENTION

This disclosure relates to approaches for managing access to resources.

BACKGROUND

Conventional middleware application solutions, i.e., serverless application frameworks, can provide interfaces that allow applications to interact with various backend systems. These conventional middleware applications solutions, however, have several disadvantages. For instance, conventional middleware applications solution frameworks are typically unable to prevent middleware application developers from malicious harvesting of tokens that are used to access other backend systems. Conventional middleware applications solutions are also typically unable to regulate or prescribe operations to middleware application developers what actions will be performed by applications when interacting with backend systems.

SUMMARY

Various embodiments of the present disclosure can include systems, methods, and non-transitory computer readable media configured to determine an access request provided by an application that seeks to interact with one or more backend systems through a computing system. One or more predefined restrictions can be enforced on the application, the computing system, or the one or more backend systems.

In an embodiment, the one or more predefined restrictions prevent continuous deployment of new and updated software in compliance with a software dependency matrix, wherein the software dependency matrix includes dependency information for software relied upon by the computing system.

In an embodiment, the one or more predefined restrictions prevent modifications to data in compliance with a data dependency matrix, wherein the data dependency matrix includes dependency information for data relied upon by the application or the computing system.

In an embodiment, the one or more predefined restrictions require the application to use a predefined software development kit (SDK) or software library.

In an embodiment, the one or more predefined restrictions require the application to use a predefined library for service discovery.

In an embodiment, the one or more predefined restrictions prevent the application from exceeding a predefined number of access requests to the one or more backend systems over a given period of time.

In an embodiment, the one or more predefined restrictions prevent the computing system from sending an amount of data to the application in excess of a predefined amount.

In an embodiment, the one or more predefined restrictions require the application to be identified in a whitelist of applications that are permitted to interact with the computing system and the one or more backend systems.

In an embodiment, the one or more predefined restrictions isolate logs generated based on interactions between the application, the computing system, and the one or more backend systems from logs generated based on interactions involving other applications.

In an embodiment, the computing system is a middleware application (serverless application) system.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Conventional middleware applications solutions, i.e., serverless application frameworks, can provide interfaces that allow applications to interact with various backend systems. These conventional middleware applications solutions, however, have several disadvantages. For instance, conventional middleware applications solutions are typically unable to regulate or prescribe operations performed by applications interacting with backend systems.

A claimed solution rooted in computer technology overcomes problems specifically arising in the realm of computer technology. In various embodiments, a middleware applications system can be configured to manage application access to one or more backend systems (e.g., backend storage systems). For example, the middleware applications system may permit applications to access data stored by the backend systems through various endpoints (e.g., application programming interfaces). For example, the middleware applications system may be implemented by a first entity, an application relying on the middleware applications system to access a backend system may be developed by a second entity, and the backend system may be managed by a third entity. In some embodiments, the endpoints provided by the middleware applications system may be associated with software code that is executed in response to calls made by an application. For example, an application may submit a call through an endpoint to request data corresponding to a particular product. In this example, in response to the application call, the endpoint may execute code that makes many different application programming interface (API) calls and ultimately returns packaged data to the application.

In various embodiments, operations of the middleware applications system and applications interacting with the middleware applications system can be managed. For example, the middleware applications system can be configured to require applications to use a predefined software development kit (SDK) or library. For instance, in some embodiments, applications interacting with the middleware applications system can be required to rely on a predefined library for performing service discovery or domain name lookups. In another example, application access to backend systems can be restricted. For example, applications or the middleware applications system may be restricted to a predefined number of access requests over a given time period. For example, an application or the middleware applications system may only be permitted to send 100 access requests to backend systems per day. In some embodiments, the middleware applications system can be configured to segregate data based on predefined associations between applications and data stored by backend systems. For example, a first application can be restricted to accessing data for a first product and a second application can be restricted to accessing data for a second product. In this example, the middleware applications system can separate log data accessed by the first application and data accessed by the second application. In some embodiments, the middleware applications system can be added to a software dependency matrix to ensure that continuous deployment of software on which the middleware applications system depends remains compatible with the middleware applications system.

Figure 1:
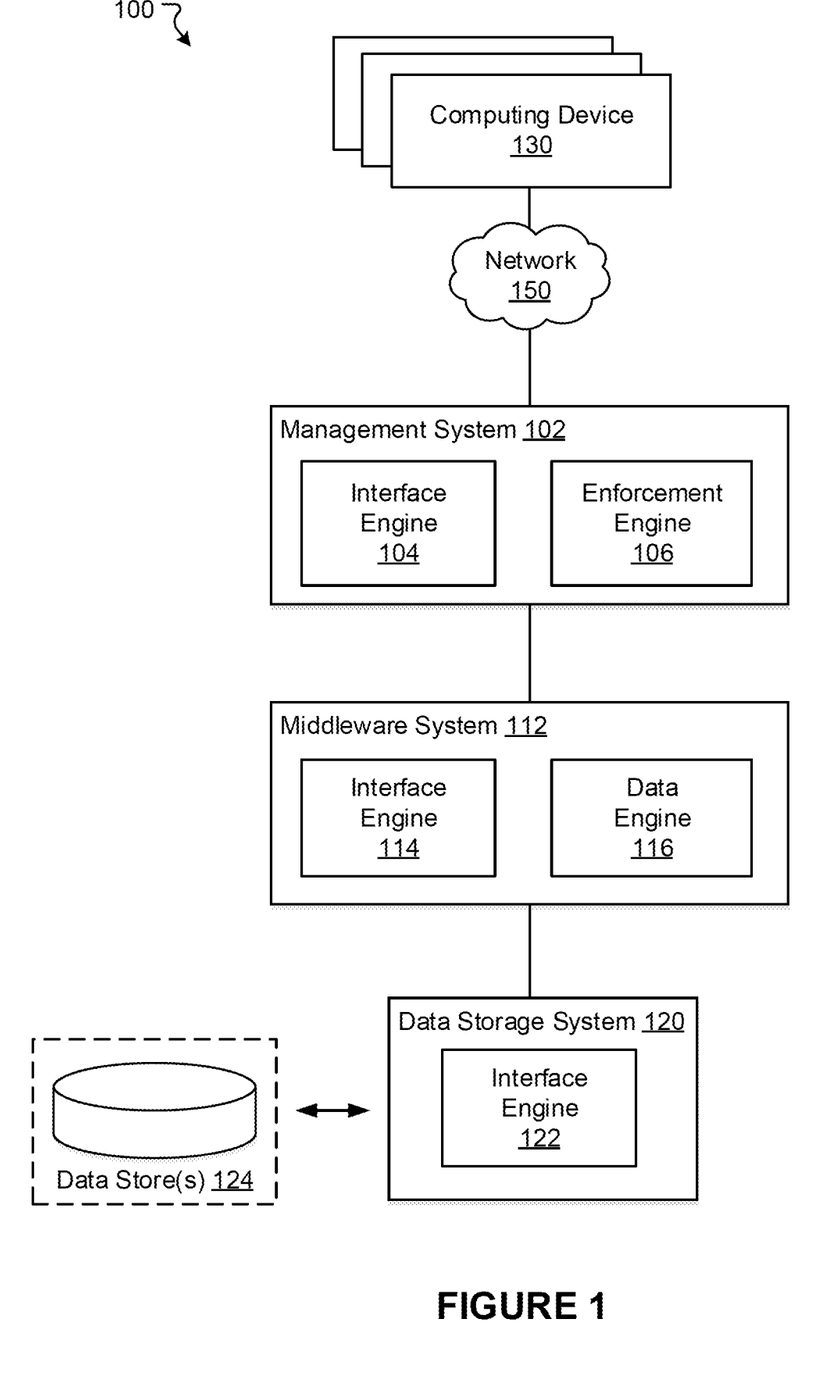
FIG. 1 illustrates an example computing environment, in accordance with various embodiments.

FIG. 1 illustrates an example environment 100, in accordance with various embodiments. The example environment 100 can include at least a management system 102, a middleware applications system 112, a data storage system 120, and at least one computing device 130. The management system 102, the middleware applications system 112, the data storage system 120, and the computing device 130 can each include one or more processors and memory. The processors can be configured to perform various operations by interpreting machine-readable instructions. The data storage system 120 can access one or more data stores 124. In general, a data store may be any device in which data can be stored and from which data can be retrieved. In some embodiments, the data storage system 120 may store and manage various data as objects in one or more object graphs. In some embodiments, an object graph may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. In some embodiments, data corresponding to populated object graphs is stored in data stores 124 and accessible through the data storage system 120. The data storage system 120 may be accessible to the management system 102 and the middleware applications system 112 either directly or over a network 150. The network 150 may be any wired or wireless network through which data can be sent and received (e.g., the Internet, local area network, etc.).

The middleware applications system 112 can be configured to process requests received from the computing device 130. For example, the requests may be generated by a user operating the computing device 130 or from software applications running on the computing device 130. In various embodiments, the middleware applications system 112 can include an interface engine 114 and a data engine 116. The interface engine 114 and the data engine 116 can be executed by the processor(s) of the middleware applications system 112 to perform various operations. In general, the interface engine 114 and the data engine 116 can be implemented, in whole or in part, as software that is capable of running on one or more computing devices or systems. In one example, the interface engine 114 and the data engine 116 may be implemented as or within a software application running on one or more computing devices (e.g., user or client devices) and/or one or more servers (e.g., cloud servers). In some instances, various aspects of the interface engine 114 and the data engine 116 may be implemented in one or more computing systems and/or devices. In various embodiments, the computing device 130 can send a request to access data to the middleware applications system 112. For example, a software application (e.g., an "app") running on the computing device 130 may rely on data stored in the data stores 124 which are managed by the data storage system 120. The interface engine 114 implemented by the middleware applications system 112 can provide an endpoint (e.g., application programming interface) through which such requests can be received. Upon receiving the request, the interface engine 114 can authenticate the computing device 130, for example, based on an access token included with the request. Once authenticated, the data engine 116 can interact with the data storage system 120 to obtain the requested data. For example, the data engine 116 can interact with an endpoint (e.g., application programming interface) provided by an interface engine 122 of the data storage system 120. The data storage system 120 can obtain the requested data from the data stores 124 and can provide the data to the middleware applications system 112. In some embodiments, the data engine 116 may perform various operations on the obtained data. For example, the data engine 116 may combine data that was obtained based on multiple requests for data made to the interface engine 122. In another example, the data engine 116 may package data based on some predefined criteria. The data engine 116 can then provide the data to the computing device 130, for example, over the network 150.

In various embodiments, the management system 102 can be configured to manage requests made to the middleware applications system 112 and/or one or more backend systems such as the data storage system 120. For example, in some embodiments, the interface engine 104 of the management system 102 can provide an endpoint through which entities (e.g., computing devices, users operating computing devices, applications running on computing devices) can submit requests to be processed by the middleware applications system 112 and/or backend systems such as the data storage system 120. In some embodiments, the enforcement engine 106 of the management system 102 can enforce predefined restrictions on entities submitting requests to the middleware applications system 112 and/or backend systems such as the data storage system 120. For example, the enforcement engine 106 can enforce one or more restrictions on the computing device 130 interacting with the middleware applications system 112. In some embodiments, the enforcement engine 106 of the management system 102 can enforce predefined restrictions on operations related to the middleware applications system 112 and/or backend systems such as the data storage system 120. More details describing the enforcement engine 106 are provided below in reference to FIG. 2.

Figure 2:
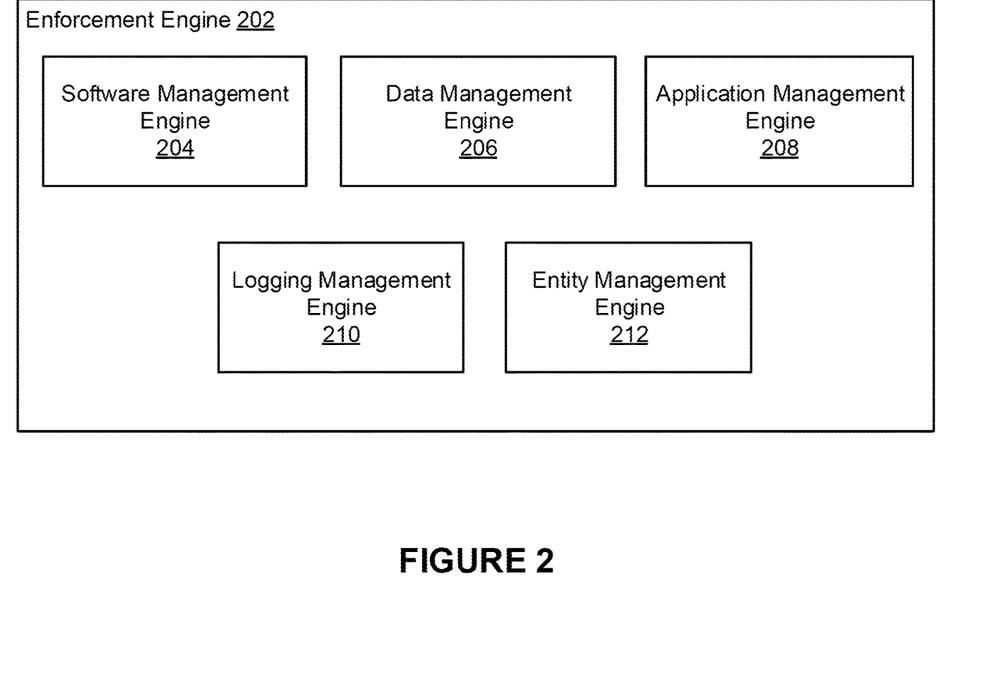
FIG. 2 illustrates an example enforcement engine, in accordance with various embodiments.

FIG. 2 illustrates an example enforcement engine 202, in accordance with various embodiments. The enforcement engine 202 may be implemented as the enforcement engine 106 of FIG. 1. In some embodiments, the enforcement engine 202 includes a software management engine 204, a data management engine 206, an application management engine 208, a logging management engine 210, and an entity management engine 212.

The software management engine 204 can be configured to manage software versions or data schema on which a middleware applications system (e.g., the middleware applications system 112 of FIG. 1) depends. In general, the middleware applications system may run software that depends on other software or specific versions of other software. For example, a software application may depend on a particular software library. In another example, if software on the middleware applications system depends on a particular version of a particular software library, the software management engine 204 prevents updates to that version of the software library if a version update to the software library dependency might interrupt service of the middleware application due to the software library introducing breaking changes in the API between versions. In some embodiments, the software management engine 204 can also ensure that the software library cannot be removed or otherwise made inaccessible to the middleware applications system. In some embodiments, the software management engine 204 includes information describing software relied upon by the middleware applications system in a software dependency matrix. In such embodiments, the software dependency matrix can be used to govern continuous deployment of new and updated software.

The data management engine 206 can be configured to manage modifications to data on which a middleware applications system (e.g., the middleware applications system 112 of FIG. 1) depends. For example, the middleware applications system (or software running on the middleware applications system) may depend on data stored in a data storage system (e.g., the data storage system 120 of FIG. 1). In this example, the data management engine 206 can ensure that data on which the middleware applications system depends is preserved and remains accessible to the middleware applications system. In another example, a software application that interacts with the middleware applications system may depend on data stored in the data storage system. In this example, the data management engine 206 can ensure that data on which the software application depends is preserved and remains accessible. In some embodiments, the data management engine 206 can ensure that a schema on which the middleware applications system (or a software application that interacts with the middleware applications system) depends remains preserved. For example, software running on the middleware applications system may rely on a particular schema for a database table stored by the data storage system. In such embodiments, the data management engine 206 can ensure that this database table schema is preserved and remains accessible. In some embodiments, the data management engine 206 includes information describing data relied upon by the middleware applications system in a data dependency matrix. In such embodiments, the data dependency matrix can be used to restrict modifications to data.

The application management engine 208 can be configured to manage software applications that interact with a middleware applications system (e.g., the middleware applications system 112 of FIG. 1) and/or one or more backend systems (e.g., the data storage system 120 of FIG. 1). In some embodiments, the application management engine 208 can permit only whitelisted software applications to interact with the middleware applications system. In some embodiments, the application management engine 208 can require software applications to use predefined software development kits, software libraries, or versions of software libraries. For example, the application management engine 208 can require software applications to use a particular software library to perform service discovery and/or domain name lookups. Many variations are possible.

The logging management engine 210 can be configured to manage data that is logged based on interactions between software applications, a middleware applications system (e.g., the middleware applications system 112 of FIG. 1), and one or more backend systems (e.g., the data storage system 120 of FIG. 1). In some embodiments, the logging management engine 210 isolates data that is generated based on interactions between software applications, the middleware applications system, and the one or more backend systems. For example, the logging management engine 210 can ensure that data logged by the middleware applications system based on interactions between a first software application, the middleware applications system, and the one or more backend systems remains segregated from data logged by the middleware applications system based on interactions between a second software application, the middleware applications system, and the one or more backend systems. This separation of logs helps prevent recreation of restricted data by malicious actors. In some embodiments, the middleware applications system can be configured to segregate data based on predefined associations between applications and data stored by backend systems. For example, a first application can be restricted to accessing data for a first product and a second application can be restricted to accessing data for a second product. The logs themselves can become entities that can be treated with similar access restrictions to the data scope they correspond to, based on the application which produced them. In this example, the middleware applications system can separate log data accessed by the first application and data accessed by the second application.

The entity management engine 212 can be configured to manage interactions with a middleware applications system (e.g., the middleware applications system 112 of FIG. 1) and/or one or more backend systems (e.g., the data storage system 120 of FIG. 1). For example, in some embodiments, the entity management engine 212 prevents entities from submitting more than a predefined number of requests to the middleware applications system. In some embodiments, the entity management engine 212 can permit entities to submit requests to the middleware applications system over predefined time periods only. In some embodiments, the entity management engine 212 restricts the number of requests that may be submitted to the middleware applications system over a given time period. In some embodiments, the entity management engine 212 prevents the middleware applications system from submitting more than a predefined number of requests to the one or more backend systems. In some embodiments, the entity management engine 212 can permit the middleware applications system to submit requests to the one or more backend systems over predefined time periods only. In some embodiments, the entity management engine 212 restricts the number of requests that may be submitted by the middleware applications system to the one or more backend systems over a given time period. In some embodiments, the entity management engine 212 can prevent the middleware applications system from processing requests after the middleware applications system and/or the one or more backend systems have sent a threshold amount of data in response to those requests. Many variations are possible.

Figure 3:
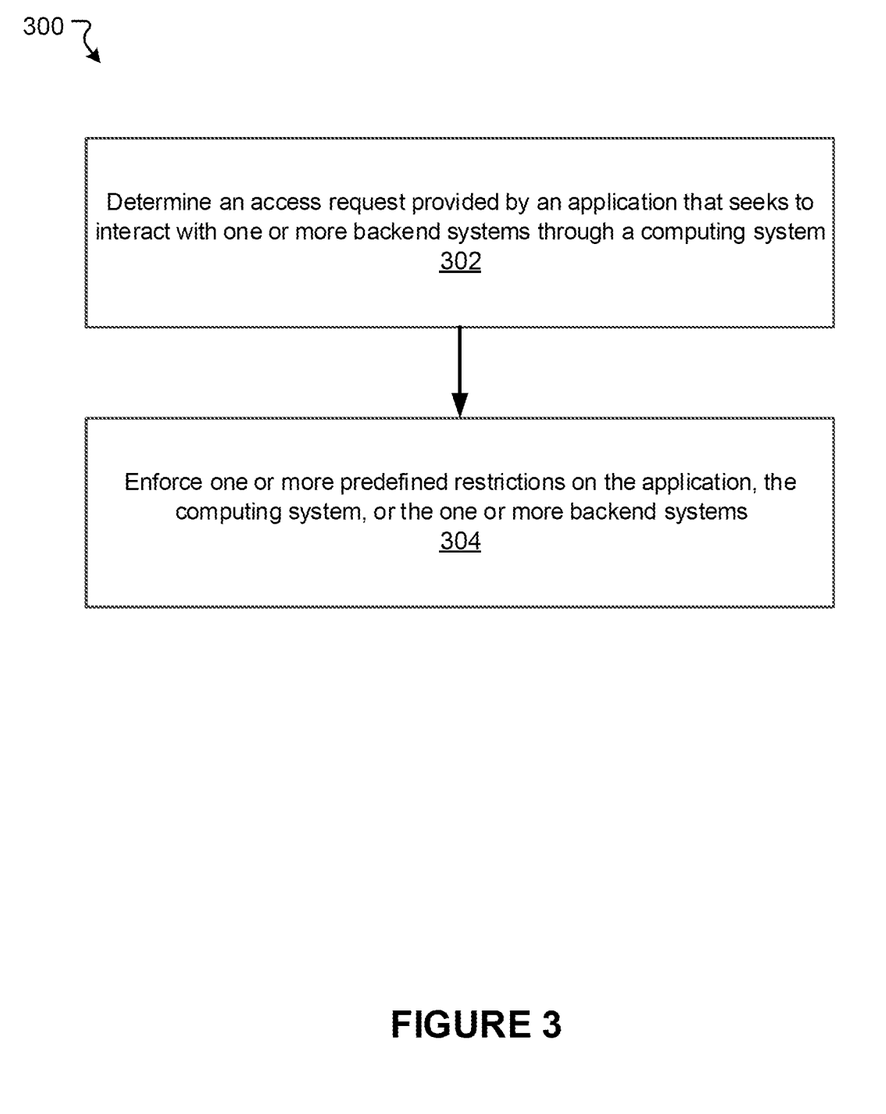
FIG. 3 illustrates a flowchart of an example method, in accordance with various embodiments.

FIG. 3 illustrates a flowchart of an example method 300, according to various embodiments of the present disclosure. The method 300 may be implemented in various environments including, for example, the environment 100 of FIG. 1. The operations of method 300 presented below are intended to be illustrative. Depending on the implementation, the example method 300 may include additional, fewer, or alternative steps performed in various orders or in parallel. The example method 300 may be implemented in various computing systems or devices including one or more processors.

At block 302, a determination is made of an access request provided by an application that seeks to interact with one or more backend systems through a computing system. At block 304, one or more predefined restrictions are enforced on the application, the computing system, or the one or more backend systems.

Figure 4:
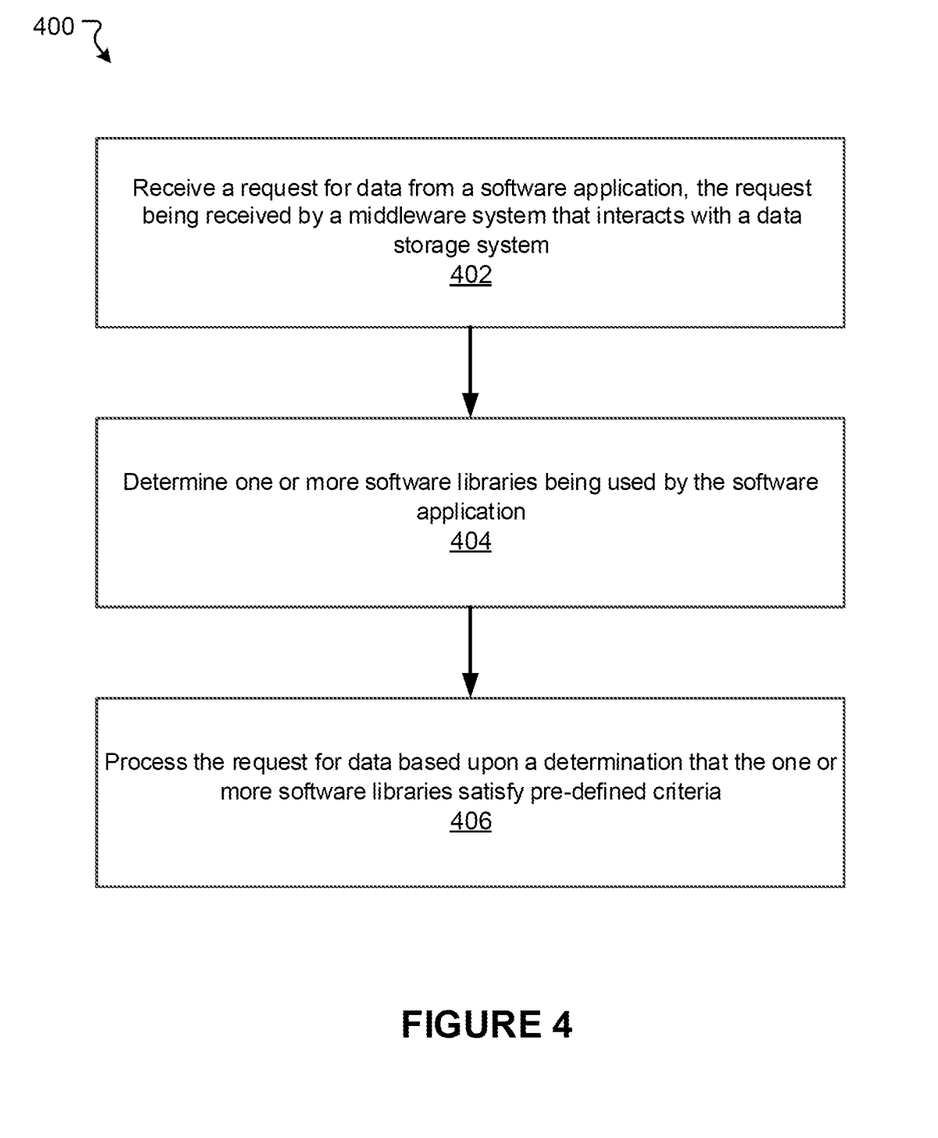
FIG. 4 illustrates a flowchart of another example method, in accordance with various embodiments.

FIG. 4 illustrates a flowchart of another example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a request for data is received from a software application, the request being received by a middleware applications system that interacts with a data storage system. At block 404, a determination is made of one or more software libraries being used by the software application. At block 406, the request for data is processed based upon a determination that the one or more software libraries satisfy predefined criteria.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
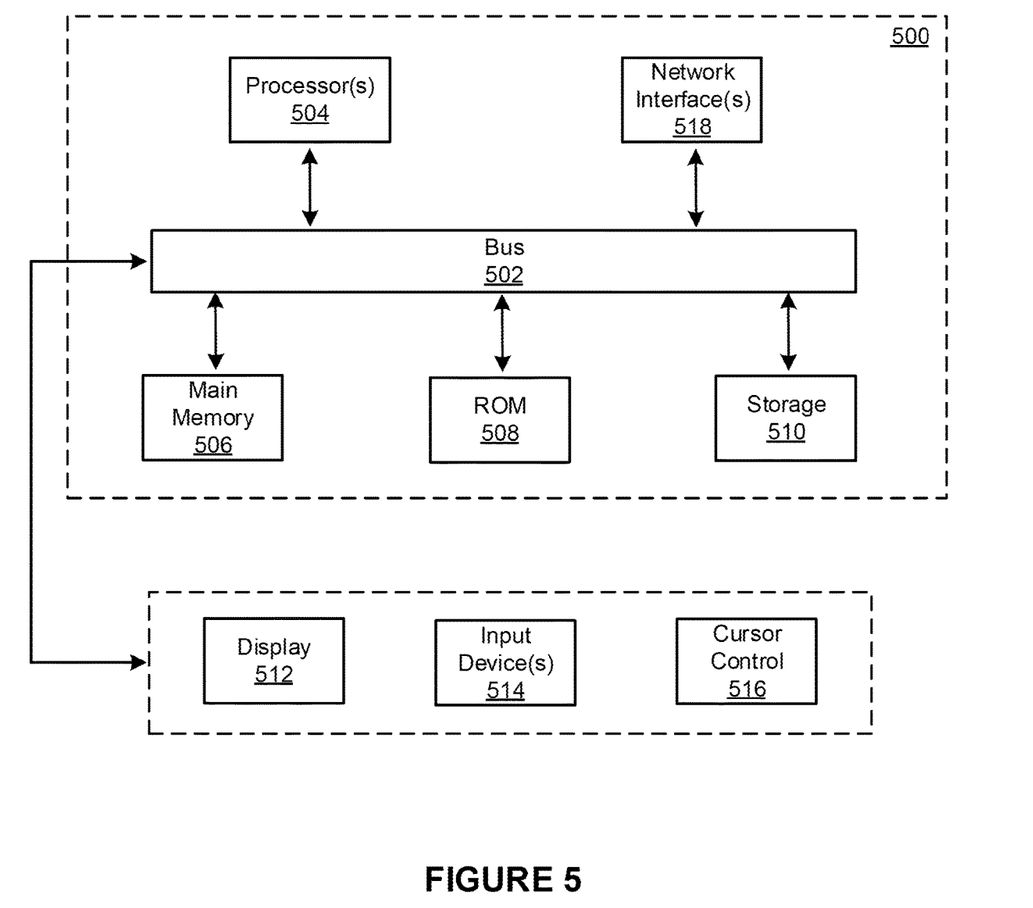
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method, comprising:
receiving, by a middleware application system, from a first application and a second application running on a first computing device and a second computing device, respectively, access requests to data stored in a database;
processing, by the middleware application system, the access requests;
determining a schema associated with an entity on which the middleware application system relies in order to retrieve the data stored in the database, wherein the entity comprises an application programming interface (API) or a database table; and
in response to determining the schema, selectively restricting modifications to the schema, wherein the selectively restricting of the modifications to the schema comprises:
determining whether an update to a particular version of a particular software library introduces a breaking change in the entity; and
in response to determining that the update does introduce a breaking change, preventing the update.

2. The computer-implemented method of claim 1, wherein the determination of a schema comprises:
accessing a dependency matrix indicating sources relied upon by the middleware applications system; and the selectively restricting of modifications to the schema comprises:
preventing modifications to respective schemas associated with the sources.

3. The computer-implemented method of claim 1, wherein the selectively restricting of modifications to the schema comprises determining whether or not to implement deployments upon the entity and on a new entity based on a predicted likelihood of the deployments interrupting service on the middleware application system.

4. The computer-implemented method of claim 1, wherein the processing of the access requests comprises segregating, by the middleware application system, subsets of data obtained from the database depending on whether the first application or the second application makes the access requests.

5. The computer-implemented method of claim 1, wherein the entity comprises a software application or a software library; and the selectively restricting of modifications to the schema comprises preventing a deletion of components of the schema.

6. A system, comprising:
a middleware application system configured to:
receive, from a first application and a second application running on a first computing device and a second computing device, respectively, access requests to data stored in a database;
process the access requests; and
one or more processors in communication with the middleware application system; and
a non-transitory memory storing instructions that, when executed by the one or more processors, cause the one or more processors to perform:
receiving an indication regarding an entity on which the middleware application system relies in order to retrieve the data stored in the database, wherein the entity comprises an application programming interface (API) or a database table;
determining a schema associated with the entity; and
in response to determining the schema, selectively restricting modifications to the schema, wherein the selectively restricting of the modifications to the schema comprises:
determining whether an update to a particular version of a particular software library introduces a breaking change in the entity; and
in response to determining that the update does introduce a breaking change, preventing the update.

7. The system of claim 6, wherein the determination of a schema comprises:
accessing a dependency matrix indicating sources relied upon by the middleware applications system; and the selectively restricting of modifications to the schema comprises:
preventing modifications to respective schemas associated with the sources.

8. The system of claim 6, wherein the selectively restricting of modifications to the schema comprises determining whether or not to implement deployments upon the entity and on a new entity based on a predicted likelihood of the deployments interrupting service on the middleware application system.

9. The system of claim 6, wherein the processing of the access requests comprises segregating, by the middleware application system, subsets of data obtained from the database depending on whether the first application or the second application makes the access requests.

10. The system of claim 6, wherein the entity comprises a software application or a software library; and the selectively restricting of modifications to the schema comprises preventing a deletion of components of the schema.

11. A non-transitory computer readable medium comprising instructions that, when executed, cause one or more processors of a computing system to perform:
receiving an indication regarding an entity on which the middleware application system relies in order to process an access request, the access request comprising retrieving data stored in a database, wherein the entity comprises an application programming interface (API) or a database table;

determining a schema associated with the entity; and in response to determining the schema, selectively restricting modifications to the schema, wherein the selectively restricting of the modifications to the schema comprises:

determining whether an update to a particular version of a particular software library introduces a breaking change in the entity; and     in response to determining that the update does introduce a breaking change, preventing the update.

12. The non-transitory computer readable medium of claim 11, wherein the determination of a schema comprises:

accessing a dependency matrix indicating sources relied upon by the middleware applications system; and the selectively restricting of modifications to the schema comprises:

preventing modifications to respective schemas associated with the sources.

13. The non-transitory computer readable medium of claim 11, wherein the selectively restricting of modifications to the schema comprises determining whether or not to implement deployments upon the entity and on a new entity based on a predicted likelihood of the deployments interrupting service on the middleware application system.

14. The non-transitory computer readable medium of claim 11, wherein the entity comprises a software application or a software library; and the selectively restricting of modifications to the schema comprises preventing a deletion of components of the schema.

* * * * *